(12) United States Patent
Reime et al.

(10) Patent No.: US 7,589,303 B2
(45) Date of Patent: Sep. 15, 2009

(54) METHOD OF DETERMINING AND/OR EVALUATING A DIFFERENTIAL OPTICAL SIGNAL

(75) Inventors: Gerd Reime, Bühl (DE); Michael Domokos, Kuernbach (DE); Peter Langer, Karlsruhe-Durlach (DE); Egbert Spiegel, Gelsenkirchen (DE)

(73) Assignee: Mechaless Systems GmbH (DE)

( * ) Notice: Subject to any disclaimer, the term of this patent is extended or adjusted under 35 U.S.C. 154(b) by 35 days.

(21) Appl. No.: 10/575,148

(22) PCT Filed: Oct. 7, 2004

(86) PCT No.: PCT/EP2004/011197

§ 371 (c)(1),
(2), (4) Date: Feb. 8, 2007

(87) PCT Pub. No.: WO2005/036209

PCT Pub. Date: Apr. 21, 2005

(65) Prior Publication Data

US 2008/0042043 A1  Feb. 21, 2008

(30) Foreign Application Priority Data

Oct. 8, 2003  (DE) .............................. 103 46 741

(51) Int. Cl.
*G01J 5/02* (2006.01)
(52) U.S. Cl. ...................... 250/205; 356/369; 398/154; 398/137; 398/162
(58) Field of Classification Search .............. 250/205; 356/369; 318/483; 398/154, 137, 162, 172, 398/211, 213
See application file for complete search history.

(56) References Cited

U.S. PATENT DOCUMENTS 5,254,853 A * 10/1993 Reich .......................... 250/221

(Continued)

FOREIGN PATENT DOCUMENTS

DE  40 04 530  8/1991

(Continued)

OTHER PUBLICATIONS

International Search Report; PCT/EP2004/011197; Jan. 24, 2005.

*Primary Examiner*—Georgia Y Epps
*Assistant Examiner*—Tony Ko
(74) *Attorney, Agent, or Firm*—Cantor Colburn LLP

(57) ABSTRACT

The invention relates to a method for determining and/or evaluating a differential, optical signal. According to the invention, at least two first light sources (S1, S2) which are sequentially clocked in terms of light and emitted in a phased manner are provided, in addition to at least one receiver (E) which is used to receive at least the alternating light portion arising from the first light sources (S1, S2). The light intensity radiating through at least one light source (S1, S2) in the measuring arrangement is controlled in such a manner that the clock synchronous alternating light portion, which occurs between different phases, is zero in the receiver (E). By determining the reception signal in the receiver (E) in relation to the phase position in order to regulate the radiated light intensity and by producing an adjustable variable (R) directly or by adding current in the receiver, it is possible to simplify digital implementation of the method with as little sensitivity loss as possible.

14 Claims, 4 Drawing Sheets

U.S. PATENT DOCUMENTS 5,610,394 A * 3/1997 Lee .................. 250/231.17
5,666,037 A * 9/1997 Reime .................. 318/483

FOREIGN PATENT DOCUMENTS

| DE | 101 06 998 | 5/2002 |
| DE | 103 18 764 | 11/2003 |
| DE | 103 00 223 | 6/2004 |
| EP | 0 706 648 | 6/1994 |

* cited by examiner

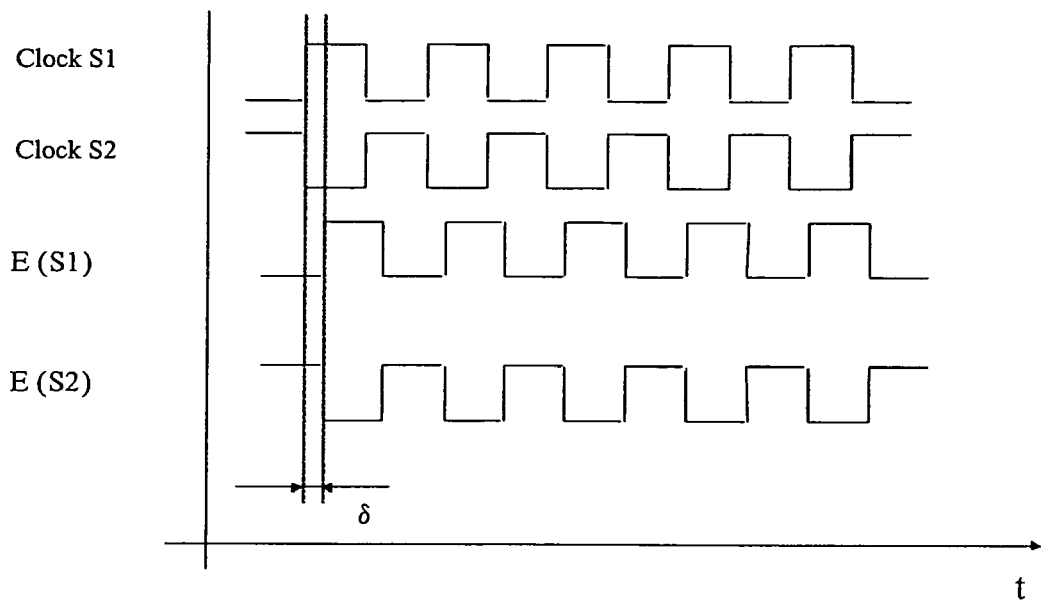
Fig. 2
Fig. 3
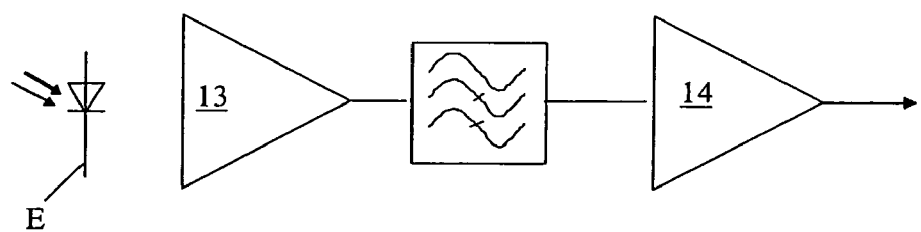
Fig. 4
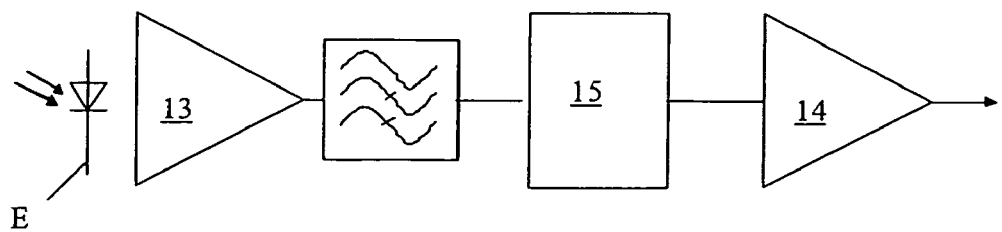

METHOD OF DETERMINING AND/OR EVALUATING A DIFFERENTIAL OPTICAL SIGNAL

REFERENCE TO RELATED APPLICATIONS

The present application claims the priority of the German patent application 103 46 741.6, filed on Aug. 10, 2003, the disclosed content of which is hereby explicitly also made the subject matter of the present application.

FIELD OF THE INVENTION

The invention relates to a method for determining and/or evaluating a differential optical signal according to the preamble of Claim 1 or Claim 4.

PRIOR ART

Photodiodes have a sensitivity to modulated light which is dependent on the absolute brightness, the so-called "ambient light effect". The incoming signal of a retroreflective sensor therefore depends not just on the reflection ratio which is to be measured, but also on the ambient light. It is therefore impossible to reliably evaluate the incoming signal when the ambient light conditions are subject to considerable fluctuations.

EP 706 648 B1, on which the preamble of Claims 1 and 4 is based, discloses a measuring method in which the transfer function of the photodiode is eliminated. For this purpose at least two light sources alternately transmit to at least one receiver, the latter being regulated such that, viewed from the receiver, they always shine with the same brightness. The incoming signal of the photodiode therefore only serves for a comparison of two signals received close in time. If the two light sources transmit an out-of-phase square-wave signal, this will result in an incoming signal of zero in the controlled circuit. This means that the amplification of the receiver can be arbitrarily selected, as only the bandpass-filtered incoming signal is evaluated. If one light source is too strong, the incoming signal corresponds to its clock and vice versa. A downstream circuit detects this and adjusts the intensity of the light sources accordingly.

There are basically two different control methods for a regulation of this kind with, e.g. two light sources:
1. One light source always transmits at a constant level, the other light source is adjusted. This is particularly appropriate if one light source shines towards the measured object, while the other irradiates directly into the receiver.
2. Both light sources are always controlled such that their total intensity remains constant. This is appropriate if both light sources illuminate the measured object.

The two regulating methods may also be combined. However steps must be taken to ensure that the regulating condition is not fulfilled by turning off both light sources. In the following formulae, which are used for illustration purposes, the symbols have the following meaning:

| Symbol | meaning |
|---|---|
| $I_1$ | Control variable of transmitter 1 |
| $I_2$ | Control variable of transmitter 2 |
| $I_m$ | Maximum value of control variable |
| k | Conversion factor between control variable and radiant flux of the light source |
| $\Phi_1$ | Emitted radiant flux of light source 1 |
| $\Phi_2$ | Emitted radiant flux of light source 2 |
| $D_1$ | Damping factor for the light path from the light source 1 to the receiver |
| $D_2$ | Damping factor for the light path from the light source 2 to the receiver |
| $f_e$ | Monotonic transfer function of the receiver |

It is assumed that the conversion function of the light source between the control variable and the radiant flux is linear for the following equations.

$$\Phi_1 = k \cdot I_1 \tag{1.1}$$

$$\Phi_2 = k \cdot I_2 \tag{1.2}$$

The regulating condition is:

$$f_e(\Phi_1 \cdot D_1) = f_e(\Phi_2 \cdot D_2) \tag{1.3}$$

using equations 1.1 and 1.2 it results:

$$I_1 \cdot D_1 = I_2 \cdot D_2 \tag{1.4}$$

For the regulating principle 1 the following additional condition introduces:

$$I_1 = I_m \tag{1.5}$$

I2 is therefore the output signal and is given by:

$$I_2 = \frac{I_m \cdot D_1}{D_2} \tag{1.6}$$

When using the regulating principle 2, the additional condition:

$$I_1 + I_2 = I_m$$

applies.

It follows that for I2, for example:

$$I_2 = \frac{I_m \cdot D_1}{D_1 + D_2} \tag{1.7}$$

The regulating method 1 is reproduced as a block diagram in FIG. 1. Two first light sources S1, S2, here LEDs, transmit square-wave-modulated light in push-pull mode to the receiver E. One transmission amplitude is adjustable. The receiver with a bandpass characteristic amplifies the incoming signal and feeds it to a controller 10. This controller, in PI configuration, now adjusts the amplitude of the adjustable first light source S1 such that the alternating signal at the receiver output becomes zero. For this purpose the controller 10 evaluates the incoming signal synchronously with the transmitter clock in order thus to detect the regulating direction. The controller 10 is divided into two parts: a detection part to determine which transmitter is stronger and an integrator for producing the correcting variable.

The following methods have until now essentially been employed to implement the detector:
  The incoming signal is sampled in each half-cycle and the difference of the two sampled values is evaluated with respect to the sign.
  The incoming signal is demodulated synchronously and the sign of the demodulation product is used to control the integrator.

In the analogue implementation so far employed the integration takes place by means of a conventional integrator circuit, while in the case of digital implementation the integrator is a counter which is controlled by the clock and the counting direction of which is controlled by the established sign.

As the digital implementation hitherto used represents a direct conversion of the analogue control circuit, the advantages of a purely digital system are not used. Analogue voltages occur in particular in the sign detection, these having to be compared very sensitively without causing the system to oscillate. For this purpose hysteresis is used in most cases to reduce the sensitivity of the system.

SUMMARY OF THE INVENTION

Taking this prior art as a starting point, the object of the present invention is to implement this method in a simplified digital form as far as possible without any loss of sensitivity.

This object is solved by a method having the features of Claim 1 or 4.

These solutions are based on the observation that, in order to assess which transmitter is transmitting the strongest, it is sufficient to assess the incoming signal in terms of the phase position. It is basically not necessary to additionally consider the amplitude. This recognition enables digital configurations to be quickly and favorably implemented without the occurrence of error signals. It is in this respect both possible to again introduce into the control system the controlled variable thus obtained as light via one of the transmitters or an additional light source as a compensation light source, although the signal thus obtained may also alternatively be added at the receiver as a current signal. Although the second alternative does not take account of all the disturbing influences which may arise on account of the components which are used, a solution of this kind may be sufficient in particular for favorable embodiments in which complete recognition of position or proximity may not be important.

The compensation preferably takes place by means of the actual light sources. Here too it is possible to add the current established as a controlled variable accordingly scaled to the current of the correspondingly weaker light source. The change-over of the phase position is then equivalent to the change-over of this additional current from one LED to the other. Further advantages will emerge from the subclaims and the following description.

BRIEF DESCRIPTION OF THE FIGURES

The invention is illustrated in detail in the following on the basis of the accompanying drawings, in which:

FIG. 2 shows signal characteristics in a control circuit according to FIG. 1, FIGS. 3, 4 show different embodiments for a receiver.

DETAILED DESCRIPTION OF PREFERRED EMBODIMENTS

Figure 1:
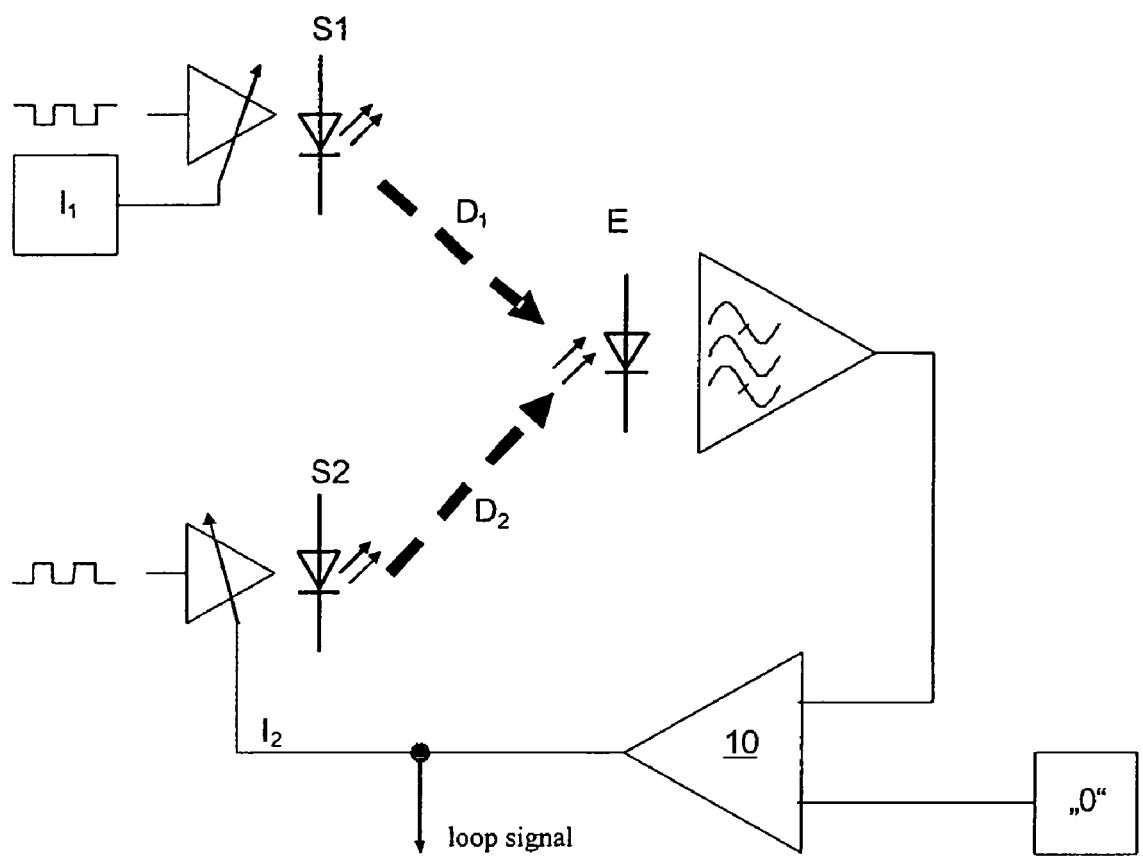
FIG. 1 shows a block diagram of a method for establishing an optical signal which is independent of extraneous light according to the prior art.

The invention is now described in detail by way of example with reference to the accompanying drawings. However the embodiments are only examples, which are not intended to limit the inventive concept to a specific arrangement.

The figures show a method for determining and/or evaluating a differential optical signal with at least two first light sources S1, S2 which emit light in a sequentially phased manner. At least one receiver E is provided to receive the signal thus emitted, this receiver receiving a sequentially emitted alternating light component from the first light sources S1, S2. The light intensity which is irradiated in the measuring arrangement through at least one light source S1, S2, which may also be a compensation light source K, is then regulated such that the clock-synchronous alternating light component, which occurs between the different phases, becomes zero at the receiver E. This was illustrated in detail at the outset in the introductory part of the description.

Taking this as a starting point, the principle which is pursued is now illustrated in general in the following before discussing the more precise implementations according to FIGS. 5 to 7.

In order to regulate the irradiated light intensity, instead of assessing and evaluating the incoming signal with regard to its amplitude, as in the case of an analogue evaluation, the incoming signal at the receiver E is determined in terms of phase position and a correcting variable is thus produced. This correcting variable R may either be transmitted as a light signal through a corresponding current to at least one of the first light sources S1, S2, although it is also possible to feed the entirety through a current signal to the receiver through current addition. The additional light source, which can regulate the light intensity, may in this respect be one of the first light sources S1, S2. However it may alternatively also be an additional light source K which is associated with the receiver, with the regulation taking place through this additional light source K such that it changes its phase as a result of this additional light source K being controlled by means of at least one EXOR gate 21 or at least one EXNOR gate.

The integral value of the phase position, that is, e.g. +1 or −1 corresponding to 0° or 180°, is integrated by means of a counter Z in order to produce the correcting variable R. The digitized incoming signal is used as a directional signal for the receiver E. The incoming signal is fed to a flipflop 16, with the clock of the flipflop being derived from the transmitting clock such that the signal of one of the first light sources S1 is reproduced in-phase and the signal of the other of the first light sources S2 is reproduced inverted as the control signal for the counting direction of the counter Z (FIG. 5). It is alternatively also possible to use the digitized incoming signal as a clock signal for the counter Z, while the counting direction is predetermined by the clock of a clock generator 12 which determines the clock of the first light source S1, S2 (FIG. 6). The incoming signal has a phase displacement of preferably 90° with respect to the clock of the clock generator 12 in the latter case. The incoming signal is preferably temporarily stored as a counter clock in the time range of the edge of the clock pulse.

In order for the counter Z to run up faster, the counter reading of the counter Z may, if required, be predetermined or is optionally predeterminable in software terms. In order to utilize the resolution of the controller as fully as possible, the correcting variable R may additionally comprise a predetermined or predeterminable, fixed component. This is particularly the case if only a specific control range is always used in a specific application. Significantly increased resolution is thus obtained for the control range which then remains and which is determined by the variable component of the correcting variable. This variable component of the correcting variable is added to the fixed component through current addition, e.g. at the light source S1, S2, K. The correcting variable R may additionally be added to the weaker light source(s) S1, S2, K in a clocked fashion through current addition.

The invention is now illustrated in further detail on the basis of embodiments and with reference to the figures. According to FIG. 2, the receiver signal corresponds to the clock of the transmitter S1 or of the transmitter S2. There is in addition an additional phase displacement d which is caused by the transfer function of the LED drivers, the receiver and, in a small proportion, by the light propagation time. The signal characteristics are represented in FIG. 2. Represented from top to bottom are the outgoing signals of the transmitter S1 and of the transmitter S2 as well as the associated incoming signals E(S1) and E(S2), in the case of which either the transmitter S1 or the transmitter S2 predominates, according to phase.

A common feature of the two implementations presented in the following is that the incoming signal is amplified to a limiting condition, so that a square-wave signal is obtained. This square-wave signal can be obtained according to FIG. 3 by means of a comparator 14 from the high-pass-filtered incoming signal, or, according to FIG. 4, through a first limiting amplification by means of a transimpedance amplifier 13 and an amplitude limiter 15, this being converted to the required digital level in a subsequent stage. This second implementation has the advantage of preventing the saturation effects in amplifiers or the differing switching times for the leading and trailing edge in comparators.

Figure 5:
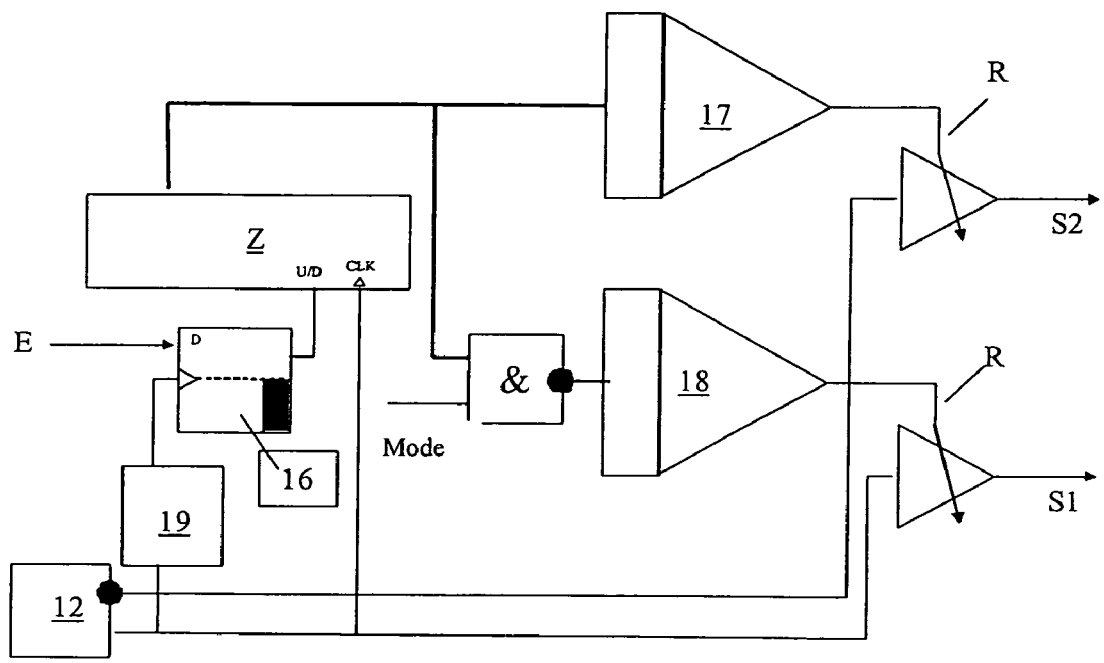
FIGS. 5, 6 show block diagrams for digital control of a method of this kind.

The implementation may take place according to FIG. 5 such that the digitized incoming signal is fed to the data line of a D flipflop 16. The clock for the flipflop is derived from the transmitting clock of the clock generator 12—if necessary by means of a time-delay circuit 19—such that, for example, the clock signal of the transmitter S1 is reproduced in-phase and that of the transmitter S2 in inverted fashion. These values, thus stored, serve as a control signal for the counting direction of the counter Z. The counter reading is converted into the transmission amplitude of, for example, the transmitter S2 by means of a D/A converter 17, 18. According to the two regulating possibilities initially mentioned, the transmitting power of the transmitter S1 is, if necessary, controlled by the inverted counter reading or the inverted D/A converter result. In the corrected state the counter Z always fluctuates periodically up and down by one counting step at the predetermined clock. The receiver E therefore controls the direction of the counter Z. Features of this implementation are:

One counting step per cycle

The receiver E need only regenerate the phase

The receiver E may be designed with extremely high amplification

Clock-synchronous operation of the counter Z

A circuit for generating a sampling pulse

Figure 6:
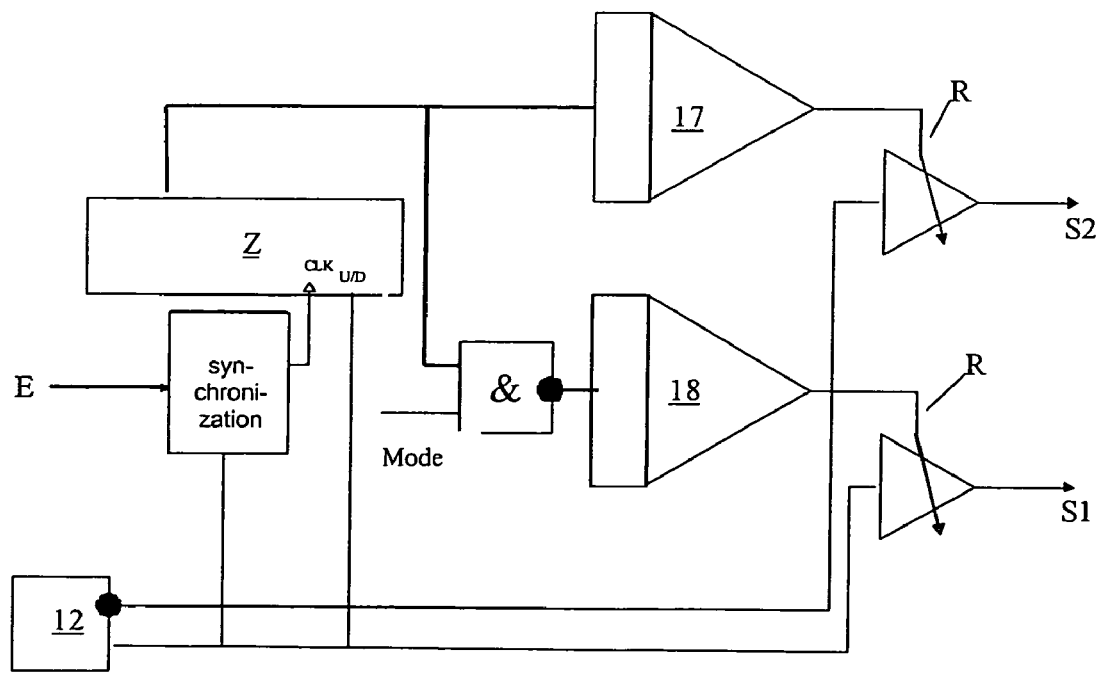

In the alternative implementation according to FIG. 6 the digitized incoming signal has a phase displacement of typically 90° with respect to the clock. This may be achieved, for example, by a bandpass filter in the receiver E. This incoming signal serves as a clock for the counter Z, while the counting direction is predetermined by the clock. In order to prevent inadmissible edge overlaps, the incoming signal serving as the counter clock is temporarily stored shortly before and after each edge of the clock pulse serving as the counting direction. In other respects the D/A converters 17, 18 are used as in FIG. 5. Features of this implementation are:

One counting step per cycle, if there is a change of direction per each half-cycle The receiver needs only to regenerate the phase, phase displacement is necessary The receiver may be designed with extremely high amplification An asynchronous clock of the counter A circuit for blocking the incoming signal in the case of an edge change of the clock pulse is necessary As in the case of the implementation according to FIG. 6, the counter reading is changed over to the transmitter drivers.

A method for the phase-correct compensation of a differential optical signal is known from the earlier German patent application 103 00 223.5. Here it is essential for the sole regulated transmitter, in most cases an additional light source K as compensator, to undergo a change in phase. The disclosed content of this application is hereby also made the subject matter of the present invention. However, in so far as this is of importance for this invention, the content of that application is illustrated in the following. In principle, when a light source emits light, a clock-synchronous electrical signal is generated in a photodiode which receives this light, e.g. following reflection from an object. Therefore, if, for example, the light-emitting diode emits light at a clock frequency of 40 kHz, the photodiode will generate a corresponding signal at the same frequency and almost the same phase. If, in the case of two light-emitting diodes operated in clocked fashion, the alternating light component which is relevant here is considered with regard to the transmitting phase of 0°, this alternating light component may be positive and negative, i.e. have a phase of 0° or 180°, as one light-emitting diode radiates at a phase of 0° and the other at a phase of 180°. In this respect 0° is identified with a positive sign and 180° with a negative sign. If an additional light source K, which operates independently of the light sources emitting the light, is now turned on, this light can irradiate out-of-phase in terms of amplitude and sign. In other words, the additional light source K can therefore take over the compensation for the most part or even alone through additional light irradiation. The clock-synchronous incoming signal is thereby influenced in terms of its amplitude by the light output of the additional light source K, even in the case of complex measuring arrangements with position, direction and distance detection, such that the incoming signal becomes zero.

Figure 7:
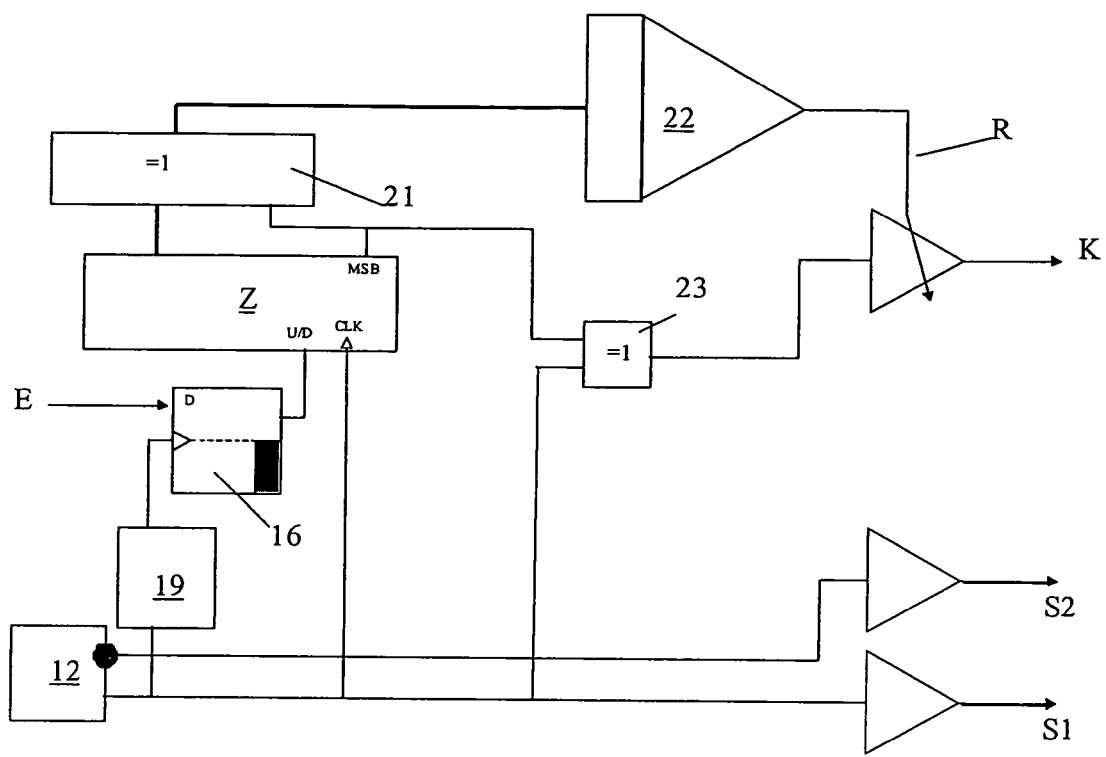
FIG. 7 shows a block diagram for regulation with a separate compensation light source.

This is achieved according to the present invention according to FIG. 7 in that the counter reading is not delivered directly, but rather via the EXOR gate 21 or optionally an EXNOR gate, to the D/A converter 22. An EXOR gate 21 with two inputs can be conceived as a controllable inverter. If a logic zero level is applied to one input (control input), the output of the gate follows the second input (data input). If, on the other hand, a logic 1 is applied to the control input, the output of the gate corresponds to the inverted data input. A gate of this kind is connected to each output of the counter Z, and all control inputs are connected to the inverted most significant bit (MSB) of the counter. There is therefore a functional connection at the gate outputs with respect to the counter reading of those shown in FIG. 7. The MSB also acts as a control signal on an EXOR gate 23, through which the clock is routed to the modulator 24 of the light source K as compensation LED. The transmitters S1 and S2 are not regulated in the embodiment of FIG. 7.

The counter Z may overflow. As a result, when the control circuit is unable to adjust on account of unfavorable optical damping conditions, the control circuit oscillates, so that the counter Z counts permanently and the intensity of one or both LEDS(s) changes cyclically. In order to prevent this, overflow is prevented by suitable wiring. For this purpose the counter Z is blocked for the counting direction concerned upon reaching the maximum or minimum counter reading. This blocking process is implemented, for example, by coupling the transmission output to the ENABLE input of the counter Z. The exact design depends on how the counter is implemented.

In the presented implementations the counter reading changes by one step per clock pulse. A larger counting step may also be initiated through a suitable logic circuit which detects that the last counting steps go in the same direction. This corresponds to a D component in the controller.

In order to accelerate a transient oscillation of the controller, the counter Z may also be able to set it to a predetermined counter reading.

If the change in the optical transmission only takes place in a narrow range, it is possible to enlarge this range. For this purpose the correcting variable is formed from two parts, namely a fixed setting in the form of an offset and a variable component which is controlled by the controller. In the case of compensation as proposed in the earlier German patent application 103 00 223.5 illustrated above, it is therefore possible to dispense with the actual compensation LED and add the regulated component to the respective in-phase transmitter through current addition.

It is understood that this description can undergo a wide variety of modifications, changes and adaptations taking place in the range of equivalents to the appended claims.

| List of reference characters | |
| --- | --- |
| 10 | controller |
| 11 | flipflop |
| 12 | clock generator |
| 13 | transimpedance amplifier |
| 14 | comparator |
| 15 | amplitude limiter |
| 16 | flipflop |
| 17, 18, 22 | digital-analogue converter |
| 19 | time-delay circuit |
| 21, 23 | EXOR gate |
| 24 | modulator |
| d | phase displacement |
| E | receiver |
| E(S1), E(S2) | incoming signals of S1, S2 |
| K | additional light source |
| R | correcting variable |
| S1, S2 | first light source |
| Z | counter |

The invention claimed is:

1. Method for determining and/or evaluating a differential, optical signal with at least two light sources which emit light in a sequentially phased manner, and with at least one receiver for receiving a sequentially emitted alternating light component from the light sources, wherein a light intensity which is irradiated into the measuring arrangement by at least one light source is regulated such that the sequentially emitted alternating light component, which occurs between different sequential phases, becomes zero at the at least one receiver (E), wherein in order to regulate the irradiated light intensity, a incoming signal at the at least one receiver (E) is determined in terms of polarity, and a correcting variable (R) for controlling the irradiated light intensity is thus produced, and wherein a value of the polarity is integrated by means of a counter in order to produce the correcting variable.

2. Method according to claim 1, wherein in order for the sequentially emitted alternating light component, which occurs between the different sequential phases, to become zero at the at least one receiver, an additional light source is used or one of the first light sources (S1, S2) is used.

3. Method according to claim 2, wherein the additional light source, which is associated with the at least one receiver, is regulated by the regulation such that the additional light source changes its sequential phase as a result of this additional light source being controlled by means of at least one EXOR gate or at least one EXNOR gate.

4. Method according to claim 1, wherein the correcting variable is added to a current signal of the receiver through current addition.

5. Method according to claim 1, wherein a counter reading of the counter is predetermined or predeterminable.

6. Method according to claim 1, wherein the value of the polarity is evaluated at 0° or 180°.

7. Method according to one of the claim 1, wherein the incoming signal is digitized and used as a directional signal for the at least one receiver.

8. Method according to claim 7, wherein the incoming signal is fed to a flipflop, wherein a sequence of the flipflop is derived from a transmitting sequence such that the signal of one of the light sources is reproduced in-phase and the signal of the other of the light sources is reproduced inverted as a control signal for a counting direction of the counter.

9. Method according to claim 1, wherein the incoming signal is digitized and used as a clock signal for the counter, while a counting direction is predetermined by the clock of a clock generator which determines the clock of the light sources.

10. Method according to claim 9, wherein the incoming signal has a phase displacement of 90° with respect to the clock of the clock generator.

11. Method according to claim 9, wherein the incoming signal is temporarily stored as a counter sequence in a time range of a edge of the sequence pulse.

12. Method according to claim 1, wherein the correcting variable (R) comprises a predetermined or predeterminable, fixed component.

13. Method according to claim 12, wherein a variable component of the correcting variable is added to the fixed component through current addition at the light source or at an additional light source.

14. Method according to claim 1, wherein the correcting variable is added to a less strongly received of the light sources, or at an additional light source.

* * * * *